United States Patent

Matsumoto et al.

(10) Patent No.: US 7,848,708 B2
(45) Date of Patent: Dec. 7, 2010

(54) RADIO COMMUNICATION SYSTEM, INTERLEAVE PATTERN CONTROL DEVICE, AND INTERLEAVE PATTERN CONTROL METHOD

(75) Inventors: Atsushi Matsumoto, Ishikawa (JP); Sadaki Futagi, Ishikawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 11/815,197

(22) PCT Filed: Jan. 31, 2006

(86) PCT No.: PCT/JP2006/301582

§ 371 (c)(1), (2), (4) Date: Jul. 31, 2007

(87) PCT Pub. No.: WO2006/082815

PCT Pub. Date: Aug. 10, 2006

(65) Prior Publication Data

US 2009/0203324 A1    Aug. 13, 2009

(30) Foreign Application Priority Data

Feb. 2, 2005    (JP)    ............................. 2005-026367

(51) Int. Cl.
H04B 7/00    (2006.01)
(52) U.S. Cl. .......................... 455/69; 455/126; 455/68; 455/67.11; 375/260
(58) Field of Classification Search .................. 455/69, 455/126, 68, 67.11, 67.13, 161.3; 375/260, 375/299, 130, 347, 349
See application file for complete search history.

(56) References Cited

U.S. PATENT DOCUMENTS

| | | | |
|---|---|---|---|
| 5,757,821 A * | 5/1998 | Jamal et al. | 714/746 |
| 5,907,563 A | 5/1999 | Takeuchi et al. | |
| 6,954,832 B2 * | 10/2005 | Suzuki et al. | 711/157 |
| 7,096,402 B2 * | 8/2006 | Yano et al. | 714/755 |
| 2001/0052099 A1 * | 12/2001 | Yano et al. | 714/755 |
| 2003/0225985 A1 * | 12/2003 | Suzuki et al. | 711/157 |
| 2004/0148552 A1 | 7/2004 | Matsumoto | |
| 2005/0007947 A1 | 1/2005 | Abe et al. | |
| 2006/0221807 A1 * | 10/2006 | Fukuoka et al. | 370/203 |
| 2008/0285666 A1 * | 11/2008 | Wang et al. | 375/260 |
| 2009/0055701 A1 * | 2/2009 | Hoshino et al. | 714/748 |

FOREIGN PATENT DOCUMENTS

CN    1240067 A    12/1999

(Continued)

OTHER PUBLICATIONS

Chinese Office Action dated Feb. 12, 2010.

(Continued)

Primary Examiner—Minh D Dao
(74) Attorney, Agent, or Firm—Dickinson Wright PLLC

(57) ABSTRACT

Disclosed is an interleave pattern control device which can reduce a reception error percentage when an interleave pattern of a repetition symbol is controlled. In an interleave selecting unit (106) as the interleave pattern control device, calculation units (123-1 to 123-N) individually calculate the signal quality of the repetition synthesization result of pilot signals deinterleaved according to the candidates of interleave patterns. A pattern determining unit (124) determines the interleave pattern on the basis of the signal quality calculated.

14 Claims, 5 Drawing Sheets

FOREIGN PATENT DOCUMENTS

| | | |
|---|---|---|
| CN | 1516937 A | 7/2004 |
| JP | 9298526 | 11/1997 |
| JP | 11298439 | 10/1999 |
| JP | 2003273842 | 9/2003 |
| JP | 200432712 | 1/2004 |
| WO | 98/16016 | 4/1998 |

OTHER PUBLICATIONS

PCT International Search Report dated Feb. 28, 2006.

Susumu Fukuoka, et al.; "OFDM ni Okeru Modulation Diversity Hoshiki no Tekio Interleaver ni Kansuru Kento," 2003 IEICE Communications Society Conference Koen Ronbunshu 1, Sep. 10, 2003, pp. 456.

Noriyuki Maeda, et al.; "Kudari Link Broadband Channel ni Okeru OFCDM to OFDM no Tokusei Hikaku," IEICE Technical Report RCS2002-162, Aug. 23, 2002, pp. 95-100.

* cited by examiner

RADIO COMMUNICATION SYSTEM, INTERLEAVE PATTERN CONTROL DEVICE, AND INTERLEAVE PATTERN CONTROL METHOD

TECHNICAL FIELD

The present invention relates to an interleave pattern control apparatus and interleave pattern control method used in a radio communication system in which a scheme such as OFDM (Orthogonal Frequency Division Multiplexing) is applied.

BACKGROUND ART

In recent years, in radio communication, particularly, in mobile communication, various kinds of data such as images other than speech have become targets of transmission. In accordance with the diversification of transmission targets, it is required to realize a technique of transmitting data at high speed.

OFDM, which is one of the multicarrier transmission schemes, is attracting attention as a transmission scheme capable of responding to the above requirement. In one example of a radio communication system in which an OFDM scheme is applied, a plurality of the same data symbols (hereinafter "repetition symbols") generated by data symbol duplication (hereinafter "repetition") from the transmitting side are arranged in the frequency domain (that is, in a plurality of subcarriers) or time domain and transmitted, and these repetition symbols are combined (by maximum ratio combining, for example) on the receiving side (in the following description, the communication scheme associated with such processing is referred to as "repetition OFDM"). In repetition OFDM, a diversity gain can be obtained by combining the repetition symbols, so that it is possible to improve the data reception quality (such as the SNR: Signal to Noise Ratio or SIR: Signal to Interference Ratio, for example) compared to a standard OFDM scheme (in which repetition is not performed).

Another approach for realizing high-speed transmission is the introduction of the interleave technique. It is generally known that the introduction of the interleave technique contributes to reduction in the reception error rate under a fading channel environment. As one example of the technique, an interleave pattern control method for adaptively changing the interleave pattern according to the reception quality of each data position is proposed (for example, refer to Patent Document 1).

Patent Document 1: Japanese Patent Application Laid-open No. 2004-32712

DISCLOSURE OF THE INVENTION

Problems to be Solved by the Invention

However, when the above-described conventional interleave pattern control method is simply applied to the radio communication of a repetition OFDM and the interleave pattern is selected without taking into consideration a diversity gain resulting from symbol combining, the diversity gain may conversely decrease, and therefore there is a certain limitation in the reduction in the reception error rate with the above-described method.

It is therefore an object of the present invention to provide a radio communication system, interleave pattern control apparatus and interleave pattern control method capable of reducing the reception error rate.

Means for Solving the Problem

The radio communication system of the present invention employs a configuration having: a radio receiving apparatus that deinterleaves a pilot signal included in a received signal using a plurality of interleave patterns, compares the quality of the obtained plurality of signals, thereby selects an interleave pattern corresponding to the best quality, and feeds back information relating to the interleave pattern to a radio transmitting apparatus; and a radio transmitting apparatus that interleaves and transmits data addressed to the radio receiving apparatus according to the fed back information.

The interleave pattern control apparatus of the present invention controls an interleave pattern used for interleaving a repetition symbol and employs a configuration having: an acquiring section that acquires a signal quality of a repetition combining result of a pilot signal deinterleaved according to candidates for the interleave pattern; and a determining section that determines the interleave pattern based on the acquired signal quality.

The radio receiving apparatus of the present invention controls an interleave pattern used for interleaving a repetition symbol, and employs a configuration having: a receiving section that receives a signal in which a pilot signal and another repetition symbol interleaved according to a predetermined interleave pattern and different from the repetition symbol are multiplexed; a first deinterleave section that deinterleaves another repetition symbol according to the predetermined interleave pattern; a second deinterleave section that deinterleaves the pilot signal according to candidates for the interleave pattern; a first combining section that performs repetition combining on another repetition symbol deinterleaved according to the predetermined interleave pattern; a second combining section that performs repetition combining on the pilot signal deinterleaved according to the candidates for the interleave pattern; a calculating section that calculates a signal quality of the pilot signal subjected to repetition combining; and a determining section that determines the interleave pattern based on the calculated signal quality.

ADVANTAGEOUS EFFECT OF THE INVENTION

According to the present invention, it is possible to reduce the reception error rate.

BEST MODE FOR CARRYING OUT THE INVENTION

Embodiments of the present invention will now be described in detail with reference to the accompanying drawings.

Figure 1:
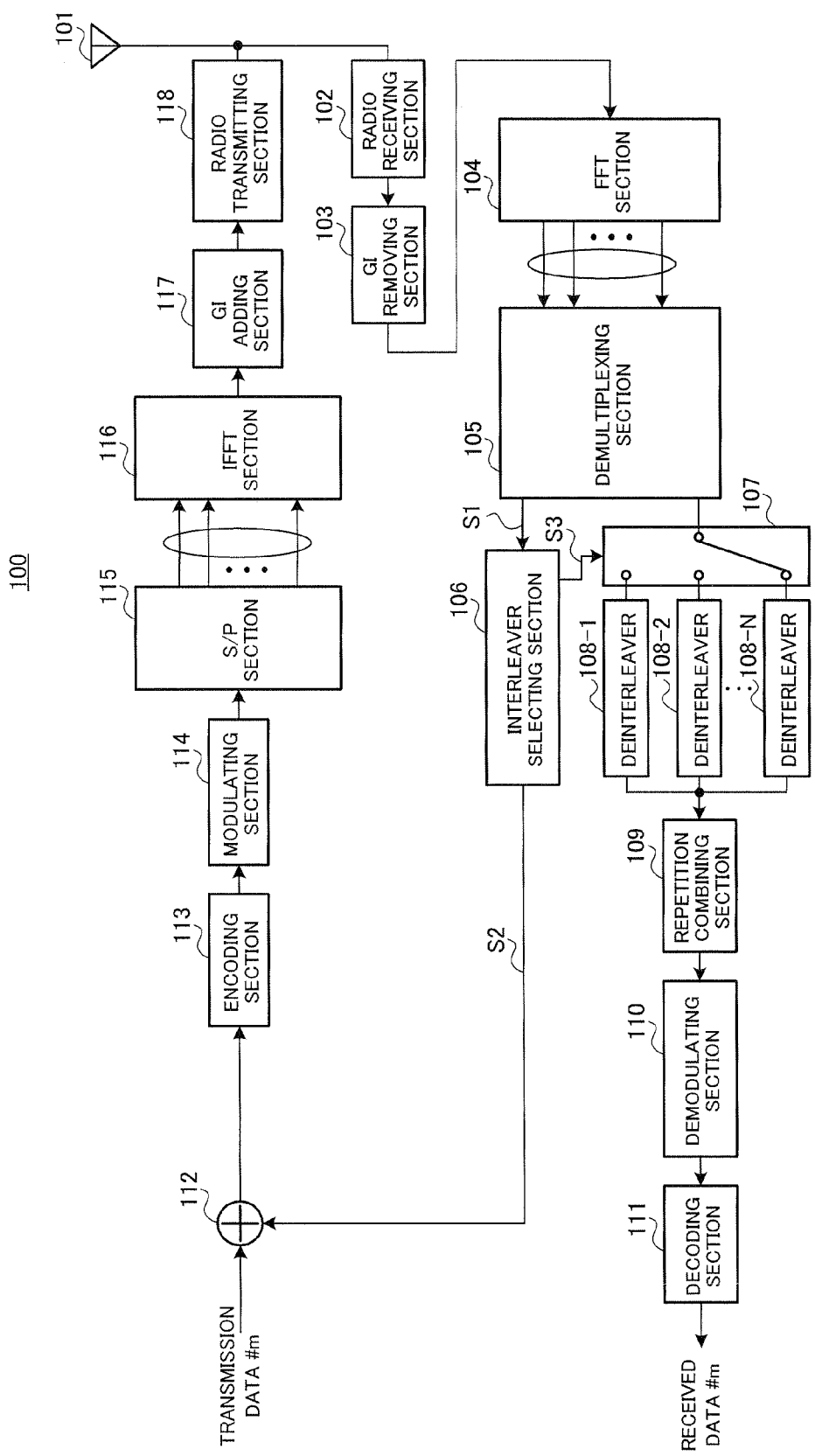
FIG. 1 is a block diagram showing a configuration of a mobile station apparatus according to an embodiment of the present invention.

FIG. 1 is a block diagram showing a configuration of a mobile station apparatus (hereinafter "mobile station") provided with a radio receiving apparatus according to an embodiment of the present invention.

Mobile station 100 of FIG. 1 has antenna 101, radio receiving section 102, GI (Guard Interval) removing section 103, FFT (Fast Fourier Transform) section 104, demultiplexing section 105, interleaver selecting section 106, switch section 107, N (where N is an integer of 2 or higher) deinterleavers 108-1, 108-2, ..., 108-N, repetition combining section 109, demodulating section 110, decoding section 111, multiplexing section 112, encoding section 113, modulating section 114, serial/parallel converting (S/P) section 115, IFFT (Inverse Fast Fourier Transform) section 116, GI adding section 117 and radio transmitting section 118.

Radio receiving section 102 receives a downlink signal transmitted from base station apparatus (hereinafter "base station") 150 described later, via antenna 101, and performs predetermined radio reception processing such as down conversion and A/D conversion, for example, on the received downlink signal. The downlink signal after radio reception processing is outputted to GI removing section 103.

GI removing section 103 removes the GI that is added at a predetermined position of the downlink signal inputted from radio receiving section 102. The GI-removed downlink signal is outputted to FFT section 104.

FFT section 104 performs FFT processing on the downlink signal inputted from GI removing section 103. Through the FFT processing in FFT section 104, a multiplexed signal is acquired from the downlink signal. Furthermore, multiplexed signal #m [where m is an arbitrary integer between 1 and M (where M is an integer equal to or greater than 2)] is a signal in which a pilot signal (hereinafter "pilot") and a plurality of repetition symbols are multiplexed, and is assigned to the mth subband. The acquired multiplexed signal #m is outputted to demultiplexing section 105.

Demultiplexing section 105 demultiplexes pilot signal S1 and the plurality of repetition symbols from multiplexed signal #m. Pilot S1 is outputted to interleaver selecting section 106. The plurality of repetition symbols are outputted to one of deinterleavers 108-1 to 108-N via switch section 107.

The identification information (interleave pattern number) of the interleave pattern of one of interleavers 108-1 to 108-N is reported to switch section 107 by interleaver selecting section 106. Switch section 107 connects the input end of the interleaver corresponding to the reported interleave pattern number and the output end of demultiplexing section 105.

Deinterleavers 108-1 to 108-N respectively correspond to typical interleave patterns #1 to #N. Deinterleaver 108-$n$ (where n is an arbitrary integer between 1 and N) deinterleaves the plurality of repetition symbols inputted from demultiplexing section 105 according to corresponding interleave pattern #n. The deinterleaved plurality of repetition symbols are outputted to repetition combining section 109. The combination of switch section 107 and deinterleavers 108-1 to 108-N configures a first deinterleaving means.

Repetition combining section 109, as a first combining means, performs repetition combining on the plurality of repetition symbols inputted from deinterleaver 108-$n$. The result of this repetition combining is demodulated by demodulating section 110, then decoded by decoding section 111, and then outputted as received data #m.

Interleaver selecting section 106, as an interleave pattern control apparatus according to this embodiment, is a function block for controlling an interleave pattern used for interleaving a plurality of repetition symbols transmitted to mobile station 100. Interleaver selecting section 106 determines the interleave pattern to be used, using pilot S1 inputted from demultiplexing section 105. Then, interleaver selecting section 106 outputs identification information signal S2 (specifically, #1, #2, ..., #n) of the determined interleave pattern to multiplexing section 112, and reports identification information signal S3 obtained by delaying identification information signal S2 by a predetermined period of time, to switch section 107. The steps for determining the interleave pattern and the configuration of the pattern will be described later.

Multiplexing section 112 multiplexes identification information S2 inputted from interleaver selecting section 106 with transmission data #m. Transmission data #m in which the identification information is multiplexed is encoded by encoding section 113, then modulated by modulating section 114, and then outputted to S/P section 115.

S/P section 115 performs serial/parallel conversion on transmission data #m inputted from modulating section 114. IFFT section 116 performs IFFT processing on transmission data #m after serial/parallel conversion. GI adding section 117 adds a GI (Guard Interval) at a predetermined position of transmission data #m after IFFT processing. Further, radio transmitting section 118 performs predetermined radio transmission processing such as D/A conversion and up-conversion, for example, on transmission data #m after the GI addition, and transmits transmission data #m after radio transmission processing to base station 150 from antenna 101.

Figure 2:
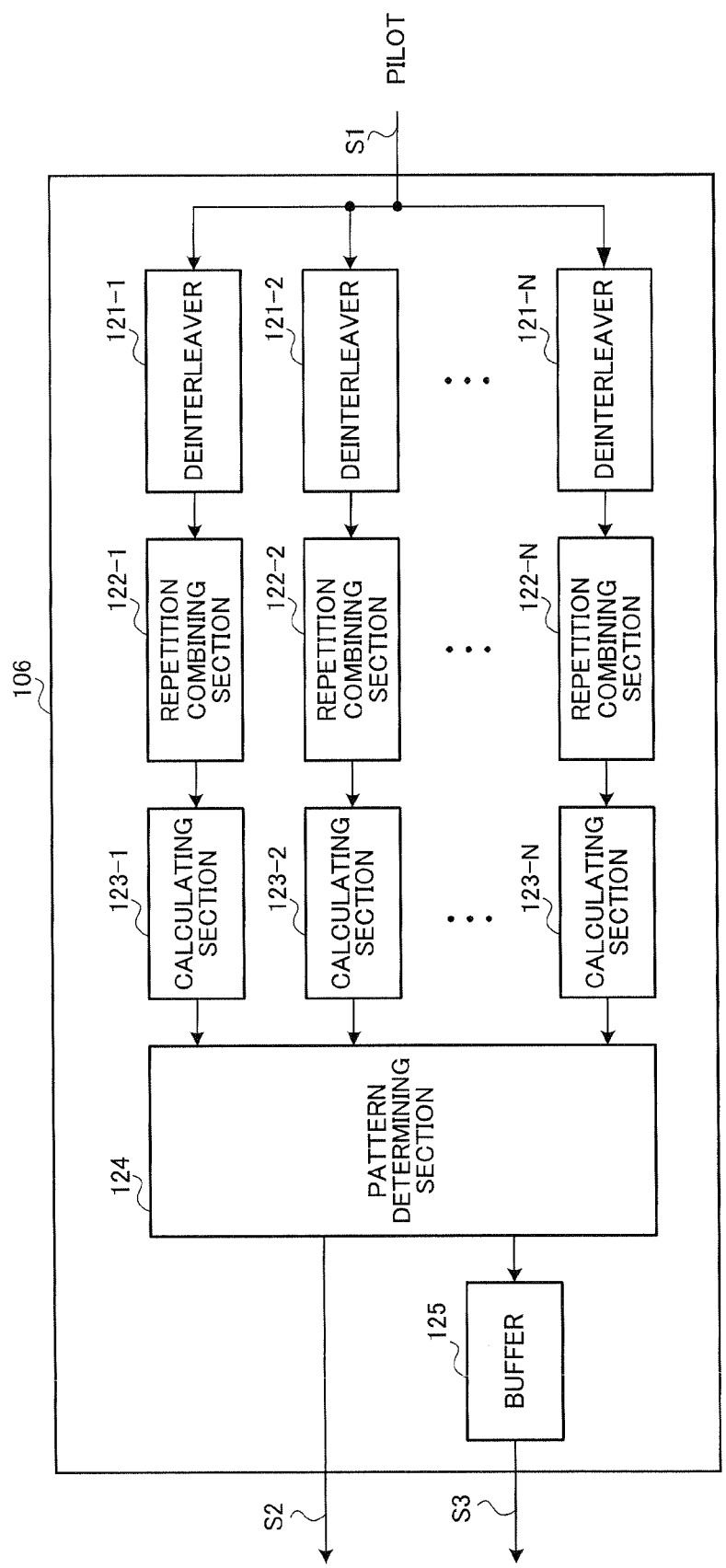
FIG. 2 is a block diagram showing a configuration of an interleaver selecting section according to an embodiment of the present invention.

Now, the internal configuration and operation of interleaver selecting section 106 will be described. FIG. 2 is a block diagram showing the internal configuration of interleaver selecting section 106. Interleaver selecting section 106 has N deinterleavers 121-1, 121-2, ..., 121-N, N repetition combining sections 122-1, 122-2, ..., 122-N, N calculating sections 123-1, 123-2, ..., 123-N, pattern determining section 124, and buffer 125. Furthermore, the combination of the deinterleaver 121-$n$, repetition combining section 122-$n$ and calculating section 123-$n$ corresponds to interleave pattern #n.

Deinterleaver 121-$n$, as a second interleaving means, deinterleaves pilot S1 inputted from demultiplexing section 105 according to interleave pattern #n. In deinterleaver 121-$n$, interleave pattern #n is used as a candidate for the interleave pattern used for interleaving the repetition symbol which is subsequently transmitted. The pilot deinterleaved by deinterleaver 121-$n$ is outputted to repetition combining section 122-$n$.

Repetition combining section 122-$n$, as the second combining means, performs repetition combining on the pilot inputted from deinterleaver 121-$n$. The pilot subjected to repetition combining is outputted to calculating section 123-$n$.

Calculating section 123-$n$, as an acquiring means, calculates the signal quality of the pilot inputted from repetition combining section 122-$n$, as a selection criterion for judging the repetition combining effect and selecting an interleave pattern. The calculated signal quality is outputted to pattern determining section 124.

Figure 3:
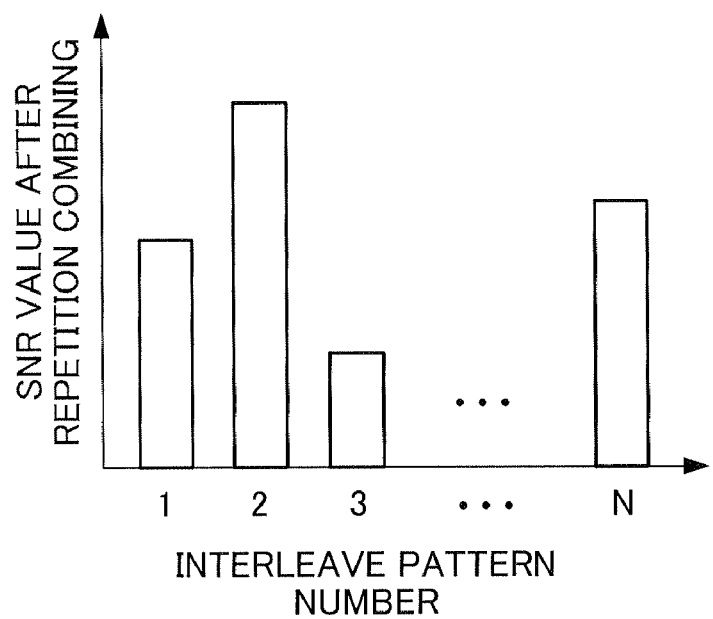
FIG. 3 shows an SNR after repetition combining according to an embodiment of the present invention.
Figure 4:
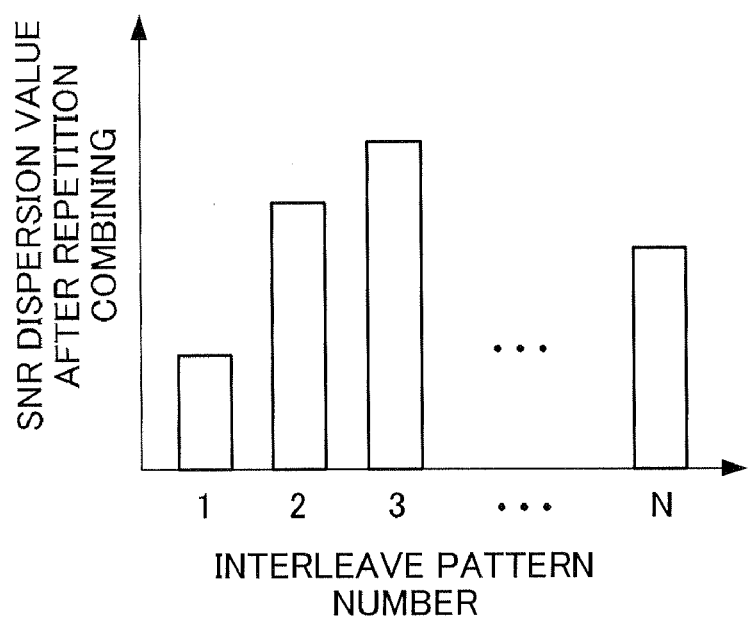
FIG. 4 shows dispersion values of the SNR after repetition combining according to an embodiment of the present invention.

The calculated signal quality may be, for example, an average SNR (Signal to Noise Power Ratio) or a dispersion value of SNR distribution. When the average SNR is employed, calculating sections 123-1 to 123-N, as shown in FIG. 3, calculate the average SNR in association with each interleave pattern number (that is, interleave pattern identification information) using the pilot after repetition combining. When the dispersion value of SNR distribution is employed, calculating sections 123-1 to 123-N, as shown in FIG. 4, calculate the dispersion value of SNR distribution in association with each interleave pattern using the pilot after repetition combining.

Furthermore, the selection criterion is not limited to the above two, and an arbitrary signal quality capable of indicating the repetition combining effect may be employed. Further, it is possible to perform calculation using a combination of a plurality of types of signal quality as the selection criterion. For example, calculating section 123-n may calculate and output both the average SNR and the dispersion value of SNR distribution to pattern determining section 124.

Pattern determining section 124 determines the interleave pattern used for interleaving the repetition symbol which is subsequently transmitted, by selecting one of N interleave patterns #1 to #N. Pattern determining section 124 uses the calculated signal quality as the interleave pattern selection criterion. That is, pattern determining section 124 cross-compares signal qualities #1 to #N inputted from calculating sections 123-1 to 123-N, and, based on the comparison result, selects an optimum interleave pattern from interleave patterns #1 to #N.

When the average SNR is employed as the selection criterion, pattern determining section 124 selects from interleave patterns #1 to #N the interleave pattern having the largest average SNR of the signal after repetition combining. For example, in reference to FIG. 3, out of the average SNRs of interleave patterns #1 to #N, the average SNR of interleave pattern #2 is larger than the average SNR values of all other interleave patterns. Thus, the maximum diversity effect can be obtained by using interleave pattern #2, and therefore interleave pattern #2 is selected as the optimum interleave pattern.

When the dispersion value of SNR distribution is employed as the selection criterion, pattern determining section 124 selects from interleave patterns #1 to #N the interleave pattern having the smallest dispersion value of the signal after repetition combining. For example, in reference to FIG. 4, out of the dispersion values of interleave patterns #1 to #N, the dispersion value of interleave pattern #1 is smaller than the dispersion values of all other interleave patterns. Thus, fading fluctuation becomes most random when interleave pattern #1 is used, and therefore interleave pattern #1 is selected as an optimum interleave pattern.

Further, pattern determining section 124 outputs to multiplexing section 112 identification information S2 (specifically, #1, #2, . . . , #n) of the selected interleave pattern. As a result, identification information S2 is reported to base station 150 via the transmission system from multiplexing section 112 to radio transmitting section 118. By reporting the identification information of the interleave pattern to base station 150 in this way, it is possible to minimize the amount of uplink feedback information.

Further, pattern determining section 124 outputs to buffer 125 identification information S2 of the selected interleave pattern. Buffer 125 holds the identification information corresponding to one frame period or several frame periods according to the processing time. The identification information inputted to buffer 125 is held in buffer 125 for only a predetermined period (that is, one frame period or several frame periods) and outputted to switch section 107 as identification information S3. As a result, identification information S3 is reported to the first interleaving means configured with switch section 107 and deinterleaver 108-n. By reporting the identification information of the interleave pattern to the first interleaving means in this way, it is not necessary to signal the interleave pattern in the downlink, and it is thereby possible to improve the downlink transmission efficiency.

Further, identification information S2 inputted to buffer 125 is held in buffer 125 for only a predetermined period and then outputted to switch section 107 as identification information S3, deinterleaver 108-n, as a first interleaving means, executes deinterleaving according to interleave pattern #n determined only a predetermined period before the timing at which deinterleaving is executed. By independently executing processing of the first interleave means and the second interleave means, it is possible to perform interleave pattern control with good accuracy and good following capability.

Furthermore, when both the average SNR and the dispersion value of SNR distribution are calculated by calculating section 123-n and inputted to pattern determining section 124, pattern determining section 124 can switch the selection criterion between the average SNR and the dispersion value of SNR distribution according to the communication environment.

For example, the selection criterion is switched according to the level of interference from other cells. When mobile station 100 is in an isolated cell, the interference from other (peripheral) cells on a downlink signal addressed to mobile station 100 is relatively small. In this case, the level of the diversity gain improvement effect resulting from repetition combining is focused on. On the other hand, when interference from other cells on a downlink signal is relatively large, it is necessary to focus on the level of the interference suppression effect resulting from repetition combining. Thus, pattern determining section 124 determines whether or not the interference components of the downlink signal are equal to or greater than a predetermined level by determining the level of the dispersion value. The average SNR is used as the selection criterion when the interference components do not exceed a predetermined level, and the dispersion value of SNR distribution is used as the selection criterion when the interference components exceed a predetermined level.

Pattern determining section 124 may switch selection criterion according to the moving speed of mobile station 100. The average SNR is used as the selection criterion when the moving speed does not exceed a predetermined value, and the dispersion value of SNR distribution is used as the selection criterion when the moving speed exceeds a predetermined value.

Figure 5:
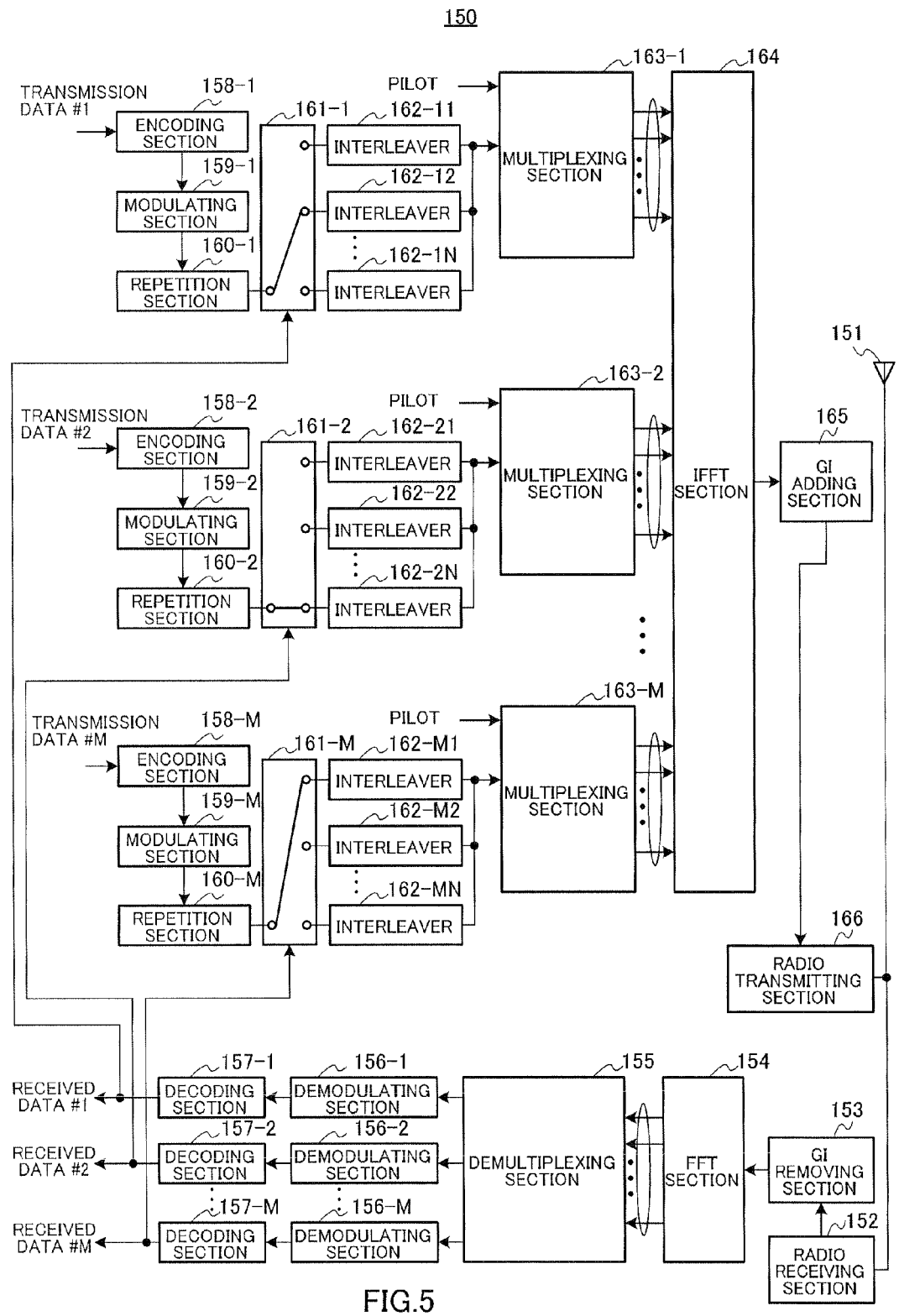
FIG. 5 is a block diagram showing a configuration of a base station apparatus according to an embodiment of the present invention.

The configuration of base station 150 will now be described. Base station 150 shown in FIG. 5 has antenna 151, radio receiving section 152, GI removing section 153, FFT section 154, demultiplexing section 155, M demodulating sections 156-1, 156-2, . . . , 156-M, M decoding sections 157-1, 157-2, . . . , 157-M, M encoding sections 158-1, 158-2, . . . , 158-M, M modulating sections 159-1, 159-2, . . . , 159-M, M repetition sections 160-1, 160-2, . . . , 160-M, M switch sections 161-1, 161-2, . . . , 161-M, M×N interleavers 162-11 to 162-MN, M multiplexing sections 163-1, 163-2, . . . , 163-M, IFFT section 164, GI adding section 165 and radio transmitting section 166.

Base station 150 is used in a mobile communication system of an OFDMA (Orthogonal Frequency Division Multiple Access) scheme, and can simultaneously perform radio communication with M mobile stations 100 at a maximum. In the following descriptions, each mobile station 100 is called "user", and the user assigned to the mth subband is called "user #m".

In base station 150, radio receiving section 152 receives a multiplexed signal in which the signals transmitted from user #m are multiplexed, and performs predetermined radio reception processing such as down-conversion and A/D conversion on the received multiplexed signal. The multiplexed signal after radio reception processing is outputted to GI removing section 153.

GI removing section 153 removes the GI that is added at a predetermined position of the multiplexed signal inputted from radio receiving section 152. The multiplexed signal after GI removal is outputted to FFT section 154.

FFT section 154 performs FFT processing on the multiplexed signal inputted from GI removing section 153. The multiplexed signal after FFT processing is outputted to demultiplexing section 155.

Demultiplexing section 155 demultiplexes the multiplexed signal inputted from FFT section 154 and obtains data #m transmitted from each user #m. Data #m is inputted to demodulating section 156-*m*.

Demodulating section 156-*m* demodulates data #m inputted from demultiplexing section 155, and then decodes the demodulated data #m. The decoded data #m is outputted as received data #m. Further, when the identification information (interleave pattern number) of the interleave pattern determined by user #m is included in received data #m, the interleave pattern number is outputted to switch section 161-*m*.

Encoding section 158-*m* encodes transmission data #m addressed to user #m. Modulating section 159-*m* modulates transmission data #m encoded by encoding section 158-*m*. The modulated transmission data #m is comprised of a data symbol sequence.

Repetition section 160-*m* performs repetition on the data symbols forming modulated transmission data #m according to a fixed or variable repetition factor. For example, the data symbol subjected to repetition according to repetition factor "2" becomes two repetition symbols, and a data symbol subjected to repetition according to repetition factor "16" becomes 16 repetition symbols. Thus, transmission data #m subjected to repetition is outputted as a symbol group including a plurality of repetition symbols. The plurality of repetition symbols are outputted to one of interleavers 162-*m*1 to 162-*m*N via switch section 161-*m*.

The identification information (interleave pattern number) of the interleave pattern of one of the interleavers 162-*m*1 to 162-*m*N is inputted to switch section 161-*m* from decoding section 157-*m*. Switch section 161-*m* connects the input end of the interleaver corresponding to the inputted interleave pattern number and the output end of repetition section 160-*m*.

Interleaver 162-*mn* corresponds to unique interleave pattern #n. Interleaver 162-*mn* interleaves the plurality of repetition symbols inputted from repetition section 160-*m* according to corresponding interleave pattern #n. The interleaved repetition symbols are outputted to multiplexing section 163-*m*.

In multiplexing section 163-*m*, transmission data #m including the plurality of repetition symbols inputted from interleaver 162-*mn* is multiplexed in a radio frame along with a pilot. Transmission data #m multiplexed by multiplexing section 163-*m* is outputted to IFFT section 164.

Figure 6:
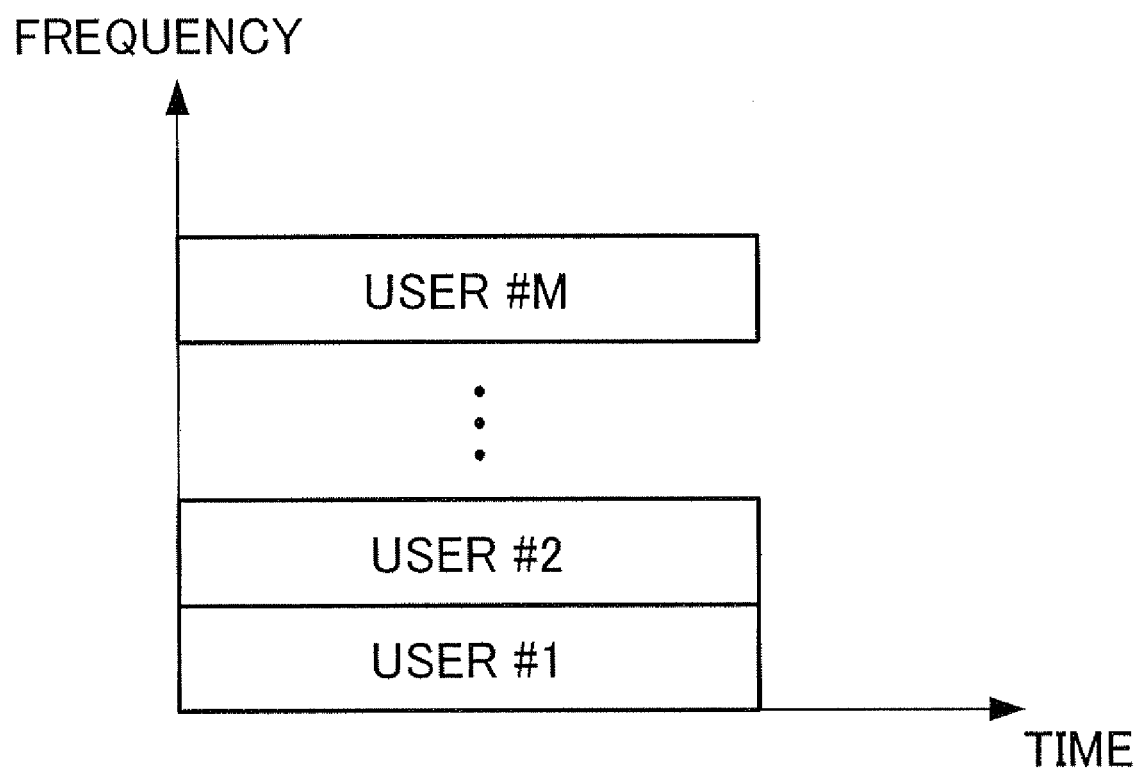
FIG. 6 shows a user multiplexed signal according to an embodiment of the present invention.

IFFT section 164 collectively performs inverse Fourier transformation on transmission data #1 to #M inputted from multiplexing sections 163-1 to 163-M. As a result, a user multiplexed signal in which users #1 to #M are frequency multiplexed as shown in FIG. 6 is generated.

GI adding section 165 adds a GI at a predetermined position of the generated user multiplexed signal. The user multiplexed signal after the GI addition is outputted to radio transmitting section 166.

Radio transmitting section 166 performs predetermined radio transmission processing on the user multiplexed signal inputted from GI adding section 165. Then, radio transmitting section 166 transmits the user multiplexed signal after radio transmission processing as a downlink signal from antenna 151 to each user #m.

In this way, according to this embodiment, an interleave pattern is determined based on the signal quality of the repetition combining result of a pilot deinterleaved according to candidates for an interleave pattern, so that it is possible to avoid a burst error and select an interleave pattern having the maximum diversity effect resulting from repetition combining, and thereby reduce the data reception error rate.

Further, in the above-described configuration, the radio receiving apparatus according to this embodiment does not perform deinterleaving on the entire received signal (including data), but performs deinterleaving using a plurality of interleave patterns on the pilot signal included in the received signal. Then, by comparing the reception quality of the plurality of signals after deinterleaving, the best interleave pattern is selected. That is, the radio transmitting apparatus does not need to prepare a plurality of signals interleaved using a plurality of interleave patterns nor transmit the plurality of signals to the radio receiving apparatus.

Further, in this embodiment, the interleave pattern control of the present invention is applied to a system of an OFDMA scheme in which a plurality of users are frequency multiplexed. That is, each user is assigned to a segmentalized frequency band. In such a system, compared to the system where users are assigned to a wideband, flexibility of channel fluctuation pattern at each user decreases. In other words, the degree of dependence of the interleave effect on the interleave pattern increases. Thus, the advantage realized by the interleave pattern control of the present invention is particularly marked in a system of an OFDMA scheme. However, the system in which the interleave pattern control of the present invention can be applied is not limited to the OFDMA scheme.

Furthermore, the interleave pattern control apparatus that realizes the interleave pattern control of the present invention is provided to mobile station 100. However, the same effect as described above can be realized even when the interleave pattern control apparatus is provided to a base station. In this case, for example, the signal quality corresponding to each interleave pattern candidate is fed back to the base station from each user, and the optimum interleave pattern is selected at the base station.

Further, in the above-described embodiment, the case has been described as an example where the reception SNR after repetition combining is used as an example of a signal quality for selecting an interleave pattern, but the present invention is not limited to this, and the signal quality may be estimated using the CIR after combining, the SIR after combining, the SINR after combining, the CINR after combining, the power after combining, the interference power after combining, or the like.

Further, a base station in the above-described embodiment may be expressed as Node B, a mobile station as UE, and a subcarrier as Tone.

Each function block employed in the description of each of the aforementioned embodiments may typically be implemented as an LSI constituted by an integrated circuit. These may be individual chips or partially or totally contained on a single chip.

Furthermore, "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2005-026367, filed on Feb. 2, 2005, the entire content of which is expressly incorporated by reference herein.

INDUSTRIAL APPLICABILITY

The interleave pattern control apparatus and interleave pattern control method of the present invention can be applied to a base station apparatus, mobile station apparatus, and the like of a radio communication system in which an OFDM scheme is applied.

The invention claimed is:

1. An interleave pattern control apparatus that controls an interleave pattern used for interleaving a repetition symbol, the interleave pattern control apparatus comprising:
a deinterleaving section that deinterleaves a pilot signal according to candidates for a plurality of interleave patterns;
a repetition combining section that performs repetition-combining on the deinterleaved pilot signal corresponding to each of the candidates for the plurality of interleave patterns;
an acquiring section that acquires signal quality of the repetition-combined pilot signal; and
a determining section that determines the interleave pattern used for interleaving the repetition symbol, based on the acquired signal quality of the repetition-combined pilot signal.

2. The interleave pattern control apparatus according to claim 1, wherein:
the acquiring section acquires an average value of a signal to noise power ratio as the signal quality of the repetition-combined pilot signal; and
the determining section determines the interleave pattern based on the average value of the signal to noise power ratio.

3. The interleave pattern control apparatus according to claim 2, wherein:
the acquiring section acquires as a first value an average value of a signal to noise power ratio of a first repetition-combined pilot signal deinterleaved according to a first candidate for the interleave pattern, and acquires as a second value an average value of a signal to noise power ratio of a second repetition-combined pilot signal deinterleaved according to a second candidate for the interleave pattern; and
the determining section selects a larger value from among the first value and the second value, and selects as the interleave pattern the first candidate or the second candidate that corresponds to the selected value.

4. The interleave pattern control apparatus according to claim 1, wherein:
the acquiring section acquires a dispersion value of a distribution of a signal to noise power ratio as the signal quality of the repetition-combined pilot signal; and
the determining section determines the interleave pattern based on the dispersion value of the distribution of the signal to noise power ratio.

5. The interleave pattern control apparatus according to claim 4, wherein:
the acquiring section acquires as a first value a dispersion value of a distribution of a signal to noise power ratio of a first repetition-combined pilot signal deinterleaved according to a first candidate for the interleave pattern, and acquires as a second value a dispersion value of a distribution of a signal to noise power ratio of a second repetition-combined pilot signal deinterleaved according to a second candidate for the interleave pattern; and
the determining section selects a smaller value from among the first value and the second value, and selects as the interleave pattern the first candidate or the second candidate that corresponds to the selected value.

6. The interleave pattern control apparatus according to claim 1, wherein:
the acquiring section respectively acquires an average value of a signal to noise power ratio and a dispersion value of a distribution of the signal to noise power ratio as the signal quality of the repetition-combined pilot signal; and
the determining section determines the interleave pattern based on the average value of the signal to noise power ratio when interference components of a received signal including the pilot signal is equal to or lower than a predetermined level, and determines the interleave pattern based on the dispersion value of the distribution of the signal to noise power ratio when the interference components are equal to or higher than the predetermined level.

7. The interleave pattern control apparatus according to claim 1, wherein:
the acquiring section respectively acquires an average value of a signal to noise power ratio and a dispersion value of a distribution of the signal to noise power ratio as the signal quality of the repetition-combined pilot signal; and
the determining section deter wines the interleave pattern based on the average value of the signal to noise power ratio when a moving speed of a mobile station apparatus that receives or transmits the pilot signal is equal to or lower than a predetermined value, and determines the interleave pattern based on the dispersion value of the distribution of the signal to noise power ratio when the moving speed is equal to or higher than the predetermined value.

8. A reception apparatus that controls an interleave pattern used for interleaving a repetition symbol, the radio receiving apparatus comprising:
a reception section that receives a signal in which a pilot signal and another repetition symbol interleaved according to a predetermined interleave pattern and different from the repetition symbol are multiplexed;
a first deinterleaving section that deinterleaves the another repetition symbol according to the predetermined interleave pattern;

a second deinterleaving section that deinterleaves the pilot signal according to candidates for the interleave pattern;

a first combining section that performs repetition-combining on the deinterleaved another repetition symbol deinterleaved according to the predetermined interleave pattern;

a second combining section that performs repetition-combining on the deinterleaved pilot signal deinterleaved according to candidates for the interleave pattern;

a calculating section that calculates signal quality of the repetition-combined pilot signal; and a determining section that determines the interleave pattern used for interleaving the repetition symbol, based on the calculated signal quality of the repetition-combined pilot signal.

9. The reception apparatus according to claim 8, wherein:

the determining section reports the interleave pattern used for interleaving the repetition symbol, to the first deinterleaving section;

the receiving section receives the repetition symbol interleaved according to the interleave pattern; and the first deinterleaving section deinterleaves the repetition symbol according to the interleave pattern reported by the determining section.

10. The reception apparatus according to claim 8, wherein:

the determining section reports identification information of the interleave pattern used for interleaving the repetition symbol, to a communicating party; and the receiving section receives the repetition symbol interleaved according to the interleave pattern, from the communicating party.

11. A communication terminal apparatus comprising the reception apparatus according to claim 8.

12. A base station apparatus comprising the reception apparatus according to claim 8.

13. An interleave pattern control method for controlling an interleave pattern used for interleaving a repetition symbol, the interleave pattern control method comprising:

deinterleaving a pilot signal according to candidates for a plurality of interleave patterns;

performing repetition-combining on the deinterleaved pilot signal corresponding to each of the candidates of the plurality of interleave patterns;

acquiring signal quality of the repetition-combined pilot signal; and determining the interleave pattern used for interleaving the repetition symbol, based on the acquired signal quality of the repetition-combined pilot signal.

14. A reception method for controlling an interleave pattern used for interleaving a repetition symbol, the radio reception method comprising:

receiving a signal in which a pilot signal and another repetition symbol interleaved according to a predetermined interleave pattern and different from the repetition symbol are multiplexed;

deinterleaving the another repetition symbol according to the predetermined interleave pattern and deinterleaving the pilot signal according to candidates for the interleave pattern;

performing repetition-combining on the another repetition symbol deinterleaved according to the predetermined interleave pattern and repetition-combining on the pilot signal deinterleaved according to the candidates for the interleave pattern;

calculating a signal quality of the repetition-combined pilot signal; and determining the interleave pattern used for interleaving the repetition symbol, based on the calculated signal quality of the repetition-combined pilot signal.

* * * * *

UNITED STATES PATENT AND TRADEMARK OFFICE
CERTIFICATE OF CORRECTION

| | | |
|---|---|---|
| PATENT NO. | : 7,848,708 B2 | |
| APPLICATION NO. | : 11/815197 | |
| DATED | : December 7, 2010 | |
| INVENTOR(S) | : Atsushi Matsumoto et al. | |

It is certified that error appears in the above-identified patent and that said Letters Patent is hereby corrected as shown below:

Claim 7, column 10, line 49, incorrectly reads: "deter wines the interleave pattern" and should read: "determines the interleave pattern"

Signed and Sealed this
Twenty-fourth Day of May, 2011

David J. Kappos
*Director of the United States Patent and Trademark Office*